(12) United States Patent
Huber et al.

(10) Patent No.: US 11,378,431 B2
(45) Date of Patent: Jul. 5, 2022

(54) SENSOR FOR MEASURING THE MASS FLOW RATE OF A FLOWABLE MEDIUM

(71) Applicant: Endress+Hauser Flowtec AG, Reinach (CH)

(72) Inventors: Christof Huber, Bern (CH); Benjamin Schwenter, Aesch (CH); Dieter Mundschin, Liestal (CH); Christian Schütze, Basel (CH)

(73) Assignee: ENDRESS+HAUSER FLOWTEC AG, Reinach (CH)

( * ) Notice: Subject to any disclaimer, the term of this patent is extended or adjusted under 35 U.S.C. 154(b) by 214 days.

(21) Appl. No.: 16/618,730

(22) PCT Filed: May 8, 2018

(86) PCT No.: PCT/EP2018/061859
§ 371 (c)(1),
(2) Date: Dec. 2, 2019

(87) PCT Pub. No.: WO2018/219603
PCT Pub. Date: Dec. 6, 2018

(65) Prior Publication Data
US 2020/0166397 A1 May 28, 2020

(30) Foreign Application Priority Data
Jun. 2, 2017 (DE) .................... 10 2017 112 271.0

(51) Int. Cl.
*G01F 1/84* (2006.01)
*G01F 25/10* (2022.01)
(52) U.S. Cl.
CPC .......... *G01F 1/8413* (2013.01); *G01F 1/8422* (2013.01); *G01F 1/8427* (2013.01); *G01F 1/8472* (2013.01); *G01F 25/10* (2022.01)

(58) Field of Classification Search
CPC .... G01F 1/8404; G01F 1/8409; G01F 1/8413; G01F 1/8418; G01F 1/8472
See application file for complete search history.

(56) References Cited

U.S. PATENT DOCUMENTS

| 5,287,754 A | * | 2/1994 | Kazakis | ................ G01F 1/8409 73/861.355 |
| 2010/0154564 A1 | | 6/2010 | Geest et al. | |
| 2017/0122787 A1 | * | 5/2017 | Murakami | ............ G01F 1/8472 |

FOREIGN PATENT DOCUMENTS

| CN | 102472653 A | 5/2012 |
| CN | 203824597 U | 9/2014 |

(Continued)

*Primary Examiner* — Erika J. Villaluna
(74) *Attorney, Agent, or Firm* — Christopher R. Powers; Endress+Hauser (USA) Holding Inc.

(57) ABSTRACT

A mass flow measuring sensor includes: an oscillatable measuring tube bent in a tube plane; an oscillation exciter for exciting bending oscillations in a bending oscillation use-mode; two oscillation sensors for registering oscillations; a support system; and a measuring sensor housing; wherein the support system has support system oscillation modes, including elastic deformations of the support plate; wherein the support plate is cut to form a number of spirally shaped spring securements, via which the support plate is secured to the measuring sensor housing with oscillation degrees of freedom, whose eigenfrequencies are lower than a use-mode eigenfrequency of the bending oscillation use-mode, wherein the use-mode eigenfrequency is lower than the eigenfrequencies of the support system oscillation modes, wherein a calibration factor describes a proportionality between a mass flow through the measuring tube and a phase difference between oscillations of the measuring tube oscillating in the bending oscillation use-mode.

22 Claims, 5 Drawing Sheets

(56) References Cited

FOREIGN PATENT DOCUMENTS

| | | | |
|---|---|---|---|
| CN | 104101393 | A | 10/2014 |
| CN | 205981316 | U | 2/2017 |
| DE | 3916285 | A1 | 11/1990 |
| DE | 102010030340 | A1 | 1/2011 |
| DE | 102015122146 | A1 | 6/2017 |
| EP | 0518124 | A1 | 12/1992 |
| EP | 0770858 | A1 | 5/1997 |
| EP | 2199756 | A1 | 6/2010 |
| JP | 2005351636 | A * | 12/2005 |
| WO | 2015076676 | A1 | 5/2015 |

\* cited by examiner

SENSOR FOR MEASURING THE MASS FLOW RATE OF A FLOWABLE MEDIUM

CROSS-REFERENCE TO RELATED APPLICATIONS

The present application is related to and claims the priority benefit of German Patent Application No. 10 2017 112 271.0, filed on Jun. 2, 2017, and International Patent Application No. PCT/EP2018/061859 filed on May 8, 2018, the entire contents of which are incorporated herein by reference.

TECHNICAL FIELD

The present invention relates to a sensor, or measuring transducer, for measuring mass flow with a single oscillatable measuring tube, wherein the measuring tube bends in its rest position in a tube plane, wherein the measuring tube has a two-fold rotational symmetry relative to an axis, which extends perpendicularly to the tube plane.

BACKGROUND

Measuring transducers of this type are described, for example, in disclosure document DE 039 16 285 A1, in EP 518 124 A1 as well as in DE 10 2015 122 146.2, which was unpublished as of the first filing of this application. Measuring transducers with a single measuring tube are advantageous, because they have no flow dividers. Other than in the case of measuring transducers with two measuring tubes, which oscillate symmetrically relative to one another, it is, however, more difficult in the case of measuring transducers with only a single measuring tube to prevent an interaction with the environment by out-coupling of oscillatory energy of a bending oscillation use-mode, or by in-coupling of disturbing oscillations from the environment. Disclosure document DE 10 2010 030 340 A1 discloses, in this regard, a measuring transducer with a single measuring tube, in the case of which the measuring tube has two parallel loops, which oscillate relative to one another and, insofar, balance one another. For this measuring transducer type, however, in principle, it is not possible to empty the measuring tube due to the bending of the measuring tube in loops, while conventional measuring transducers of the field of the invention can basically be designed to be emptied.

As contribution toward preventing an interaction with the environment by out-coupling of oscillatory energy of a bending oscillation use-mode, or by in-coupling of disturbing oscillations from the environment, EP 518 124 A1 describes applying a frequency separation between the oscillations of the measuring tube and oscillations of other components of the measuring transducer.

In manufacturing facilities, such measuring transducers can also be applied in accelerated reference systems, for example, in filling, or bottling, facilities, or connected with robots. In such case, it has been found that such accelerations can influence the calibration factor of the measuring transducer and, insofar, disturb the measurement.

SUMMARY

It is an object of the present invention to provide an as compact as possible and, in such case, disturbance insensitive, measuring transducer. The object is achieved according to the invention by the measuring transducer as defined in independent claim 1.

The measuring transducer of the invention for measuring mass flow of a flowable medium comprises:

a single oscillatable measuring tube for conveying the medium, wherein the measuring tube bends in its rest position in a tube plane;

a tube inlet section;

a tube outlet section;

at least one oscillation exciter for exciting bending oscillations of the measuring tube in a bending oscillation use-mode;

at least two oscillation sensors for registering oscillations of the measuring tube;

a support system having a support plate, at least one inlet-side securement body and at least one outlet-side securement body; and a measuring transducer housing;

wherein the support system has support system oscillation modes, which comprise elastic deformations of the support plate;

wherein the measuring tube is connected with the support plate by means of the inlet-side securement body and by means of the outlet-side securement body and is bounded by the securement bodies, wherein the measuring tube adjoins inlet-side the tube inlet section and outlet-side the tube outlet section and is connectable into a pipeline via the tube inlet section and the tube outlet section, wherein the tube inlet section and the tube outlet section are each connected solidly with the measuring transducer housing, wherein the support plate has a number of especially spirally shaped spring securements, wherein each spirally shaped spring securement is released from the support plate by at least one cut in the support plate, wherein the support plate is resiliently secured relative to the measuring transducer housing via the one or more spirally shaped spring securements, such that the support plate has three translation oscillation degrees of freedom and three rotation oscillation degrees of freedom, wherein the eigenfrequencies of oscillations of the support plate relative to the measurement device housing due to the translation oscillation degrees of freedom and the rotation oscillation degrees of freedom are lower than a use-mode eigenfrequency of the bending oscillation use-mode, wherein the use-mode eigenfrequency is lower than the eigenfrequencies of the support system oscillation modes, wherein the measuring tube has a two-fold rotational symmetry relative to a symmetry axis, which extends perpendicularly to the tube plane, wherein a calibration factor Calf describes in first approximation a proportionality between a mass flow through the measuring tube and a phase difference between oscillations of the measuring tube in oscillating in the bending oscillation use-mode at the sites of the two oscillation sensors, wherein the oscillation sensors are so positioned that an angular velocity dependence of the calibration factor Calf in the case of rotations of the measuring transducer about a rotational axis, which extends perpendicularly to the symmetry axis of the two-fold rotational symmetry and perpendicularly to a longitudinal axis of the measuring transducer, has a minimum, or exceeds the value of the minimum by no more than 20%, especially no more than 10% and preferably no more than 5% of such value.

It has been found that rotations around this rotational axis have the greatest influence on the calibration factor. A positioning of the oscillation sensors, which minimizes this influence, contributes, consequently, significantly to the performance of the measuring transducer in accelerated reference systems.

In another development of the invention, the securement bodies are so positioned that the use-mode eigenfrequency has a frequency separation from the nearest eigenfrequency of another oscillatory mode of the measuring tube, which is not less than a frequency separation limit value, wherein the frequency separation limit value amounts to at least 2%, especially at least 4% and preferably at least 8% of the use-mode eigenfrequency.

In the case of the measuring transducer of the invention, thus, besides the frequency separation between the oscillation modes of the measuring tube, on the one hand, and the support system oscillation modes, or oscillations of the support plate, relative to the measuring transducer housing, on the other hand, the positioning of the securement bodies achieves that disturbing oscillation modes of the measuring tube act, at most, negligibly on the bending oscillation use-mode.

Although the bending oscillation use-mode is preferably an oscillatory mode, in the case of which the measuring tube oscillates perpendicularly to the tube plane, in the ascertaining of the frequency separations, all oscillation modes of the measuring tube are important, thus, besides such with oscillations perpendicular to the tube plane, also such with oscillations in the tube plane.

Suitable positioning of the securement bodies can be determined, for example, by position dependent ascertaining of the eigenfrequencies of oscillation modes of the measuring tube by means of FEM simulation.

The especially spirally shaped spring securements decouple with little effort all oscillation modes between measuring transducer housing and support plate in the frequency range of the bending oscillation use-mode and, indeed, independently of the oscillation direction. These are significantly advantageous compared with the cantilever springs of WO 2015/076 676 A1. Such cantilever springs only permit deflections perpendicularly to the plane of the support plate. Oscillations in the plate plane can, consequently, not be decoupled by such cantilevers.

In another development of the invention, an evaluation function, which is proportional to the frequency separation and inversely proportional to the use-mode eigenfrequency and to the calibration factor Calf, has a local, or especially absolute, maximum, wherein the securement bodies are so positioned that the evaluation function is lower than the value of the maximum by no more than 8%, especially no more than 4% and preferably no more than 2%. The calibration factor Calf dependent on the securement body position can be ascertained, for example, by FEM simulation.

The evaluation function enables a balanced consideration of robustness against disturbing oscillations, on the one hand, and great measuring sensitivity, on the other hand, in the design of the measuring transducer. This is exactly important as regards a compact sensor design, for which other aspects will be considered below.

In another development of the invention, the bending oscillation use-mode is an F3 bending oscillation mode, in which the measuring tube oscillates perpendicularly to the tube plane. In the case of this oscillatory mode, the integral of acceleration along the measuring tube is minimum. Insofar as the F3 bending oscillation mode also has the two-fold symmetry of the measuring tube, there are in total also no torques on the securement bodies. As a result, at most, negligible fractions of the vibration energy are dissipated via the securement blocks. Correspondingly, the F3 bending oscillation mode is also scarcely disturbed via external vibrations.

In another development of the invention, the eigenfrequencies of oscillations of the support plate relative to the measurement device housing due to the translation oscillation degrees of freedom and the rotation oscillation degrees of freedom are at most half of the use-mode eigenfrequency of the bending oscillation use-mode, wherein the support system eigenfrequency amounts to at least twice the use-mode eigenfrequency.

In another development of the invention, the number of spirally shaped spring securements is 1, 2, 3, or 4. The embodiment with four spirally shaped spring securements is, currently, preferable, since, in this way, a securement of the support plate corresponding to the two-fold rotational symmetry of the measuring tube is simple to implement, in that the springs are correspondingly arranged. Fundamentally, that is also possible with only two springs, however, then manufacturing tolerances become more noticeable in the releasing of the springs by correspondingly cutting the support plate.

In another development of the invention, the measuring tube bends with an S-shape, wherein in the tube plane a longitudinal direction (z) exists, with respect to which the measuring tube axis has at no point an angle of greater than 85°, especially no more than 83°. Especially with a vertical orientation of the longitudinal direction, the measuring tube thereby is assured of being capable of being emptied.

In another development of the invention, the measuring tube has between the two securement bodies two outer straight sections and one central straight section, which are connected by two arcuate (e.g., circular) shaped sections, wherein the two securement bodies are arranged at respective ones of the outer straight sections.

The axis of the two-fold rotational symmetry extends through the central straight section. The tube inlet section and the tube outlet section adjoin the outer straight sections.

Because of the arrangement of the securement bodies at the outer straight sections, in contrast with measurement sensors of the state of the art, an especially compact construction in the longitudinal direction is implemented. Insofar as this has a inclination to provide an increased stiffness of the measuring tube relative to the Coriolis mode superimposed on the bending oscillation use-mode, firstly, a higher calibration factor (Calf) results. Here, however, the above mentioned evaluation function enters into consideration, with which this disadvantageous consequence of the compact construction can be at least partially canceled.

In another development of the invention, in each case, an angle bisector extends between tube central axes of the central straight section and one of the outer straight sections, wherein the oscillation sensors are applied at the measuring tube, in each case, between an intersection of one of the angle bisectors with the measuring tube and a point on an outer straight section of the measuring tube removed a radius of curvature of the circularly shaped section, especially a half radius of curvature, preferably a fourth radius of curvature, from the transition of the circularly shaped section to the outer straight section.

Mounting the sensors on the outer straight sections at the transition between the bent section and the outer straight section, or near thereto, minimizes the rotation dependence of the calibration factor Calf.

In another development of the invention, the tube inlet section and the tube outlet section contribute, relative to the translation oscillation degrees of freedom and the rotation oscillation degrees of freedom of the support plate relative to the measuring transducer housing, supplementally to the one or more springs, in each case, to a degree of freedom specific spring constant, wherein a contribution of the tube inlet section deviates from a corresponding contribution of the tube outlet section by, in each case, no more than 10%, and especially no more than 5%, of the, in each case, lower contribution.

In another development of the invention, the shared contribution of the tube inlet section and the tube outlet section to none of the degree of freedom specific spring constants amounts to no more than 40%, especially no more than 20% and preferably no more than 10%.

In another development of the invention, the tube inlet section and the tube outlet section have essentially the same tube cross section as the measuring tube, especially the same tube material as the measuring tube and are preferably manufactured as one piece with the measuring tube.

In another development of the invention, the eigenfrequencies of the translation oscillation degrees of freedom and rotation oscillation degrees of freedom of the support plate amount to not less than 70 Hz, especially not less than 100 Hz, and/or no more than 400 Hz. In this way, it is assured that typical disturbing vibrations of technical plants cannot excite the support plate to oscillate.

In another development of the invention, in each case, an angle bisector (w1, w2) extends between a tube central axis of the central straight section and a tube central axis of one of the outer straight sections, wherein a coordinate system is present with a z axis extending in the tube plane perpendicularly to the angle bisectors (w1, w2), wherein the axis of the two-fold rotational symmetry forms the x axis, wherein an x-z-plane defined by the x axis and the z axis cuts through the outer straight sections away from the securement bodies.

In another development of the invention, the oscillation exciter is arranged in the center of the two-fold rotational symmetry, and wherein the oscillation exciter is adapted to excite bending oscillations perpendicularly to the tube plane.

In another development of the invention, in each case, an angle bisector extends between a tube central axis of the central straight section and a tube central axis of one of the outer straight sections, wherein a coordinate system is present with a z axis extending in the tube plane perpendicularly to the angle bisectors, wherein the axis of the two-fold rotational symmetry forms the x axis, wherein the y axis extends in parallel with the angle bisectors through the intersection of the x axis and z axis, wherein a characteristic base area of the measuring tube is defined by a rectangle, whose sides, on the one hand, extend in the z direction through, in each case, an intersection of one of the angle bisectors with the tube axis of a bent section and, on the other hand, in the y direction through, in each case, an intersection of one of the securement bodies with the tube axis of the measuring tube, wherein the ratio of the rectangular area to the inner diameter of the measuring tube amounts to no more than 8000, especially no more than 6000, and preferably no more than 5000.

In another development of the invention, the inner diameter of the measuring tube amounts to no more than 5 mm.

BRIEF DESCRIPTION OF THE DRAWINGS

The invention will now be explained based on the examples of embodiments presented in the drawing, the figures of which show as follows.

DETAILED DESCRIPTION

Figure 1A:
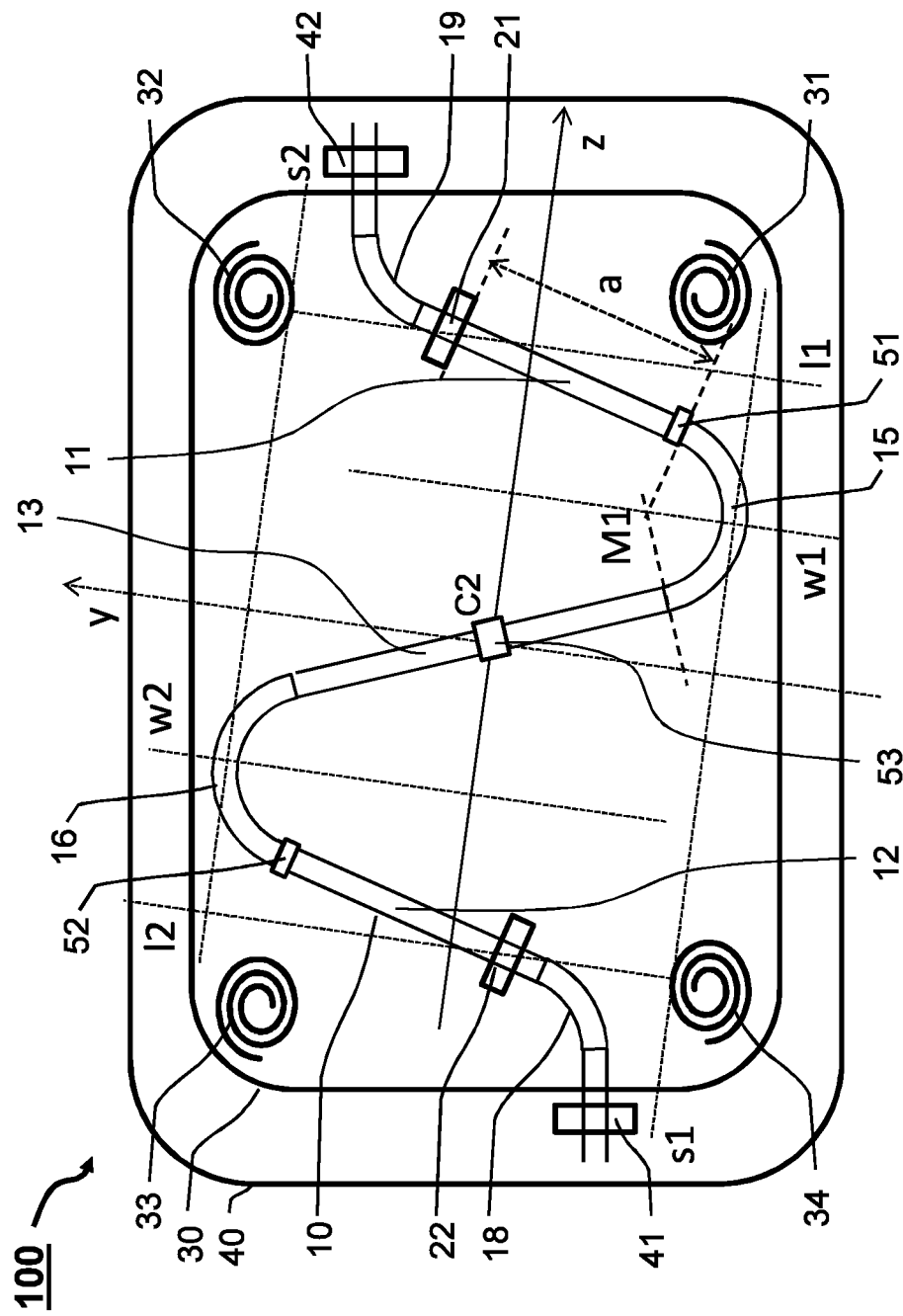
FIG. 1a shows a plan view of an example of an embodiment of a measuring sensor of the present disclosure.

The measuring transducer 100 includes a measuring tube 10 with a first straight outer section 11, a second straight outer section 12 and a central straight section 13 as well as a first bent section 15 and a second bent section 16. The two straight outer sections 15, 16 are, in each case, connected by means of one of the bent sections 15, 16 with the central straight section 13. The measuring tube 10 is bounded by two securement bodies 21, 22, and secured by the latter to a bending-stiff support plate 30. Measuring tube 10 extends essentially in a tube plane parallel to the support plate 30. The measuring tube has a two-fold rotational symmetry about a symmetry axis, which extends perpendicularly to the tube plane through a point C2 centrally of the central measuring tube section. The measuring tube has an inner diameter of, for example, 5 mm or less. It is manufactured of a metal, especially stainless steel or titanium. Metal support plate 30 has a thickness of, for example, 5 mm. Support plate 30 includes four spiral shaped spring securements 31, 32, 33, 34, which are especially cut out by means of a laser, and which likewise have the two-fold rotational symmetry relative to one another and relative to the symmetry axis through the point C2. With securement bolts (not shown), which are secured in the centers of the spirally shaped spring securements, the support plate 30 is anchored to a housing plate 40 of a sensor housing.

Figure 3:
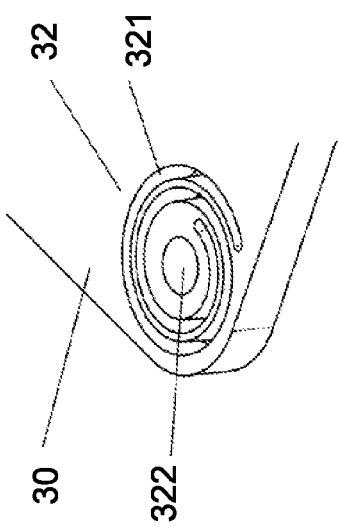
FIG. 3 shows a detail view of a spirally shaped securement of a measuring sensor of the present disclosure.

A spirally shaped spring securement 32 is shown in more detail in FIG. 3. The effective stiffness of the spirally shaped securement 32 results from the length of the spiral cut 321 as well as its width relative to the width of the remaining material of the support plate 30. In the center, the spirally shaped spring securement 32 includes a bore 322 to accommodate a securement bolt.

Figure 4:
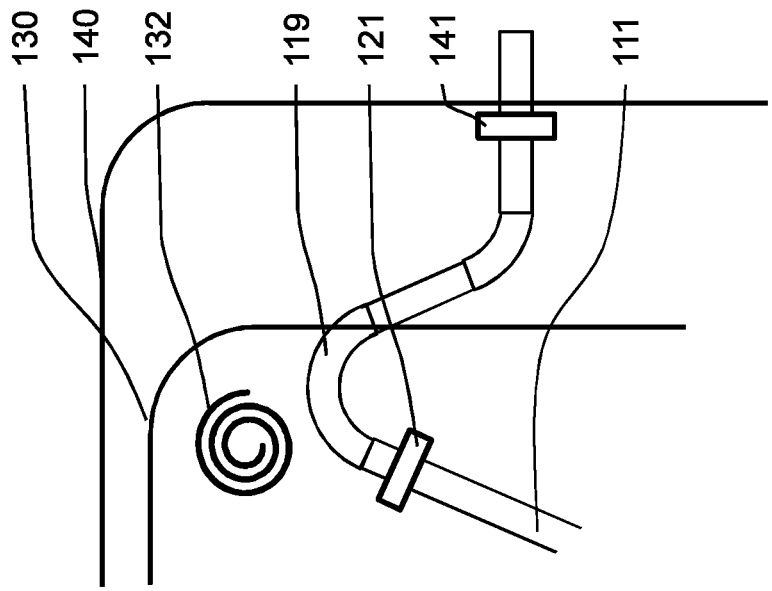
FIG. 4 shows a detail view of an inlet or outlet section of an example of an embodiment of a measuring sensor of the present disclosure.

Because of the spirally shaped spring securements 31, 32, 33, 34, the support plate 30 has three translation oscillation degrees of freedom and three rotation oscillation degrees of freedom, whose eigenfrequencies are at least 70 Hz, in order to prevent resonant oscillations with vibrations of up to 50 Hz frequently arising in process facilities. In order not to degrade the soft suspension of the support plate achieved by the spirally shaped spring securements 31, 32, 33, 34, the measuring tube is connectable to a pipeline via a sufficiently soft tube inlet section 18 and a sufficiently soft tube outlet section 19. The housing includes a first and second housing securements 41, 42, which are solidly connected with the housing plate 40, and where the tube inlet section 18 and the tube outlet section 19 are secured, in order to suppress a transmitting of oscillations of the pipeline to the measuring tube via the tube inlet section 18 and the tube outlet section 19. The translation- and rotation oscillation degrees of freedom of the support plate 20 have, in each case, eigenfrequencies $f_i$, which are proportional to the square root of a quotient of a spring constant $k_i$ and an inertial term $m_i$, thus, $f_i \propto (k_i/m_i)^{1/2}$. The tube inlet section 18 and the tube outlet section contribute in total no more than 10% to their neighboring spring constants $k_i$. The illustrations in FIG. 1 of the tube inlet section 18 and the tube outlet section 19 are essentially schematic. FIG. 4 shows an embodiment of a tube outlet section 119, in the case of which by additional tube length and arcs the stiffness and therewith the contribution to the spring constants is reduced. The tube inlet section is correspondingly, symmetrically embodied.

Figure 1B:
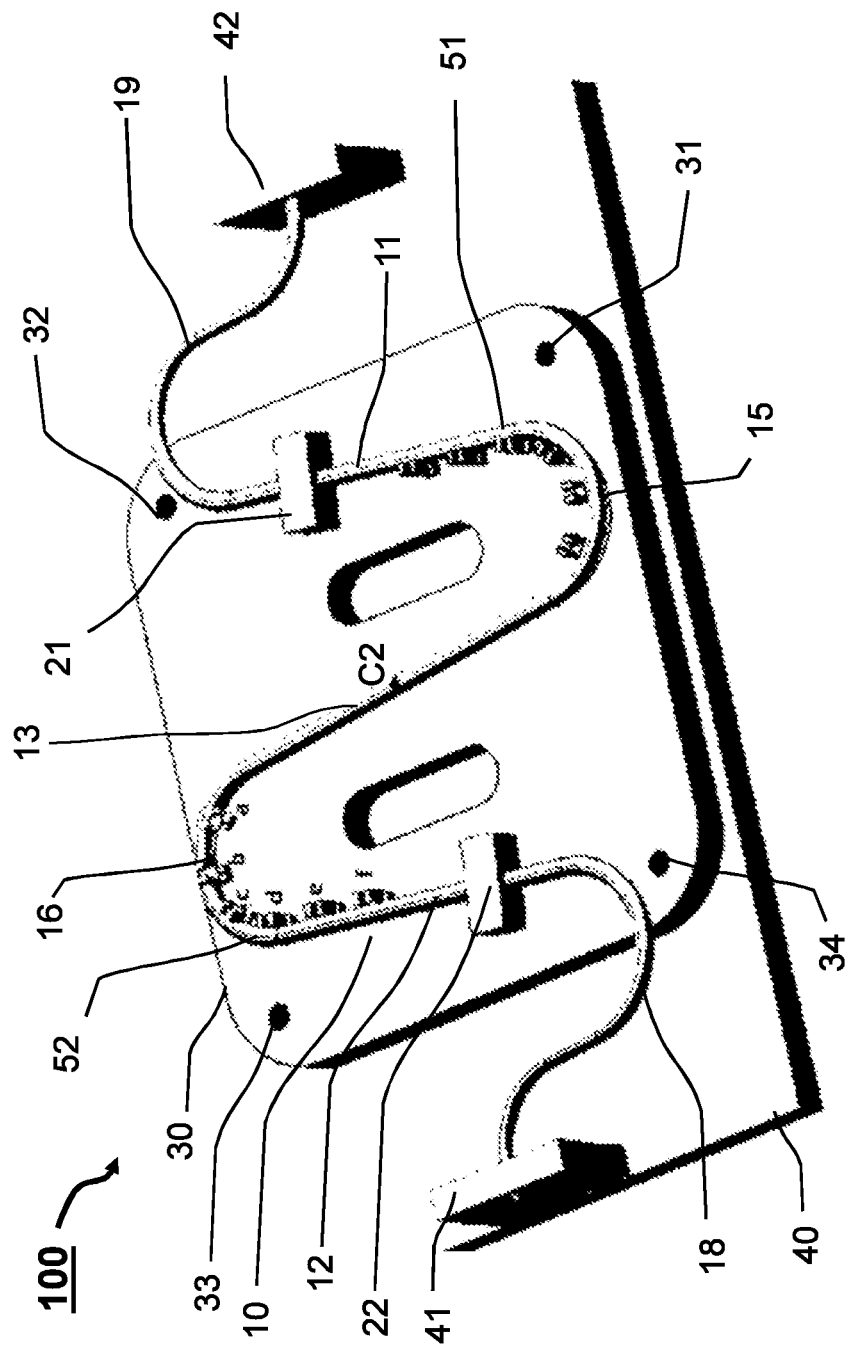
FIG. 1b shows a spatial illustration of an example of an embodiment of a measuring sensor of the present disclosure.
Figure 2A:
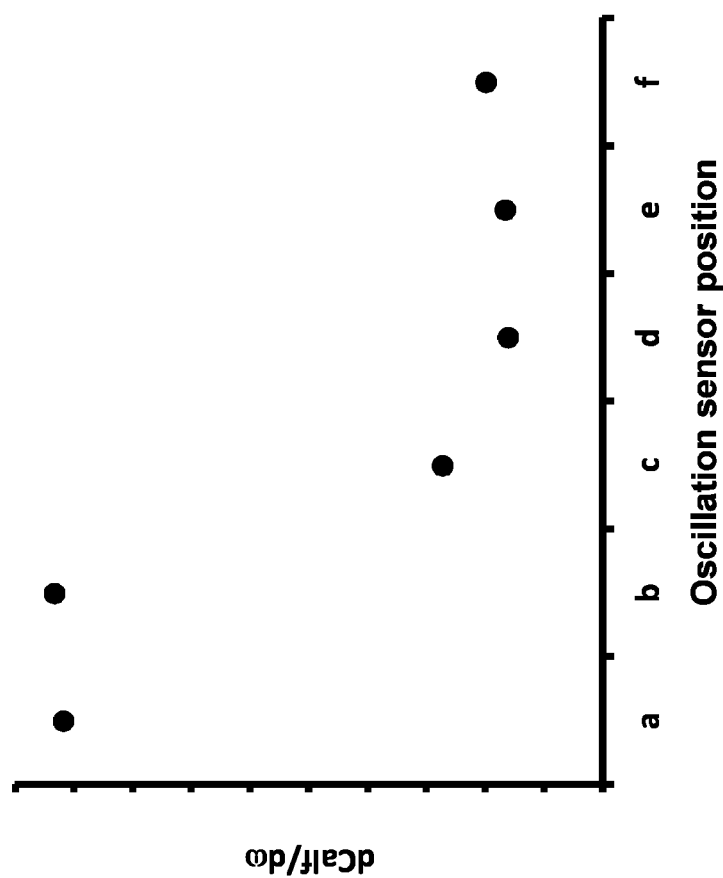
FIG. 2a shows a graph of dependence of a calibration factor (Calf) on the rotational speed (ω) as a function of sensor position (a-f)

As further shown in FIGS. 1a and 1b, the measuring transducer 100 includes for registering the oscillations of the measuring tube a first electrodynamic oscillation sensor 51 and a second electrodynamic oscillation sensor 52. For ascertaining optimal sensor position, the angular velocity dependence of the calibration factor Calf for rotations around the y axis shown in FIG. 1a was considered for the different oscillation sensor positions shown in FIG. 1b with a to f. The consideration occurred using numerical simulation. The results of this are shown in FIG. 2a. This study showed a minimum dependence, thus, an optimum, at the position d at the transition between the bent section and the outer straight section. Arranged directly bordering this transition are the oscillation sensors 51, 52, here, in each case, on one of the two straight outer sections 11, 12. The parts of the oscillation sensors oscillating with the measuring tube have, additionally, a principal axis of inertia, which aligns with the measuring tube axis at the site of their mounting.

For exciting bending oscillations, the measuring transducer includes an electrodynamic exciter 53, which is arranged in the center C2 of the two-fold rotational symmetry and acts in the direction of the symmetry axis.

The center C2 is origin of a coordinate system for description of further aspects of the invention. The measuring tube lies in a y-z-plane, wherein the y axis extends in parallel with the angle bisectors w1, w2, each of which extends between a tube axis of the straight outer sections 11, 12 and the tube axis of the central straight section 13. The z axis extends perpendicularly to the y axis in the tube plane and defines a longitudinal axis of the measuring transducer 100. When the longitudinal axis is arranged vertically, the measuring transducer is optimally emptiable. The inclination of the straight sections is then equal to half the angle between a tube axis of the straight outer sections 11, 12 and the tube axis of the central straight section 13. In the case of a preferred example of an embodiment of the invention, this inclination amounts to 7°.

Figure 2B:
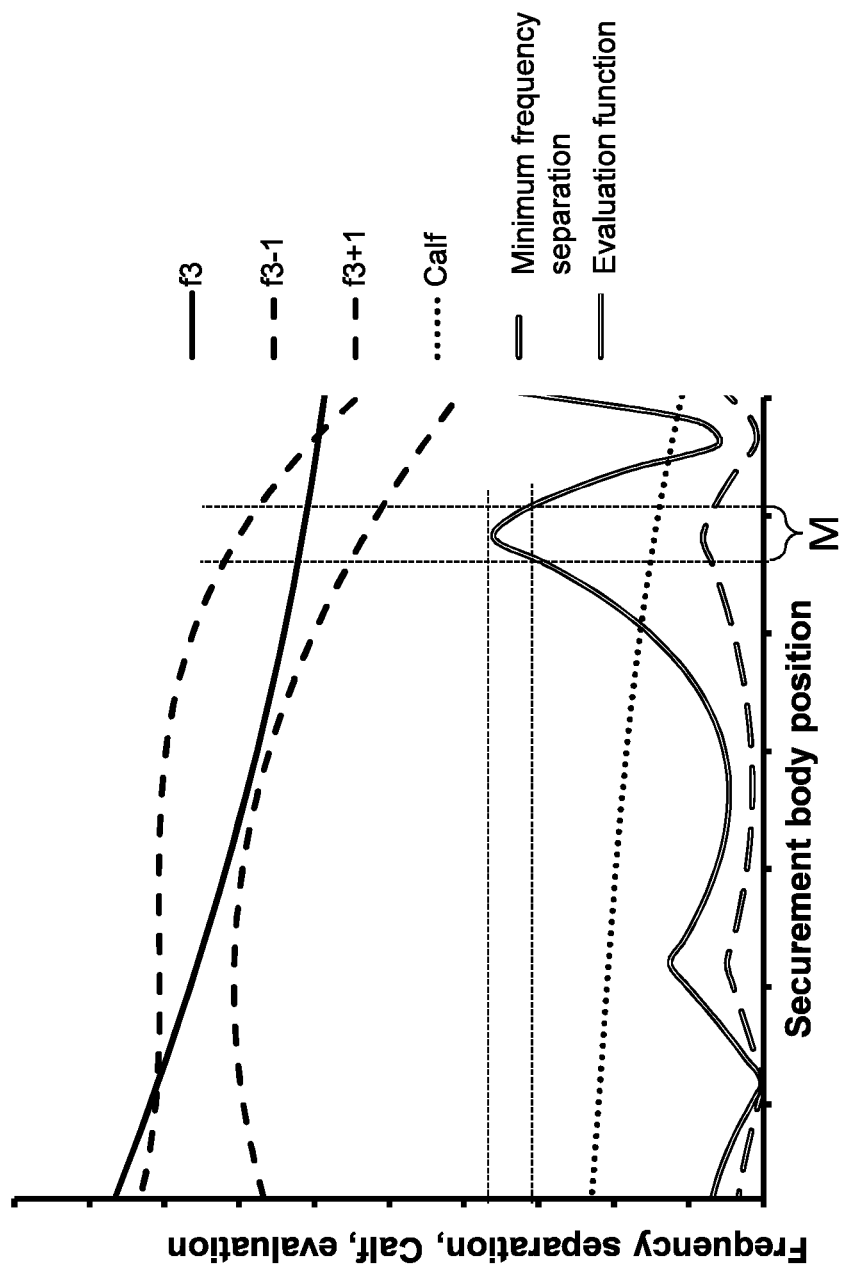
FIG. 2b shows a graph concerning aspects of an evaluation function for positioning securement bodies.

For positioning the securement bodies 21, 22, reference is now made to FIG. 2b, which shows an evaluation function and its components. For building the evaluation function, firstly, the eigenfrequencies of oscillation modes of the measuring tube are ascertained for different securement body positions by means of numerical simulation. The result is shown here for bending oscillation use-mode F3 and the bending oscillation modes F3−1 and F3+1 neighboring as regards the eigenfrequencies. Furthermore, a calibration factor Calf:=(dm/dt)/dφ is ascertained for the different securement body positions by means of numerical simulation. This calibration factor describes the relationship between a mass flow rate and the flow dependent phase difference between the sensor signals of the oscillation sensors. The evaluation function is then calculated as the quotient of the minimum frequency separation between the bending oscillation use-mode and a neighboring oscillatory mode and the calibration factor Calf. An optimal position of the securement body, in the case of which the evaluation function has a maximum, serves for orientation for the actual positioning of the securement body. A deviation from the optimal position can be accepted, when thereby the value of the evaluation function is subceeded by no more than 2%. In the illustrated example of an embodiment, the position of the securement body 21, 22 is so fixed by means of the evaluation function that the z axis of the measuring tube intersects the outer straight sections 11, 12 of the measuring tube spaced from the securement bodies 21, 22. As a result, a disturbance insensitive measuring transducer with a compactly arranged measuring tube is implemented, which is also not disturbed by accelerated reference systems.

The invention claimed is:

1. A vibronic measuring transducer for measuring mass flow of flowable medium, comprising:
    an oscillatable measuring tube configured to convey the medium therethrough, the measuring tube having an inlet side and an outlet side, wherein the measuring tube is bent in its rest position in a tube plane;
    a tube inlet section adjoining the inlet side of the measuring tube;
    a tube outlet section adjoining the outlet side of the measuring tube;
    at least one oscillation exciter configured to excite bending oscillations of the measuring tube in a bending oscillation use-mode;
    two oscillation sensors configured to register oscillations of the measuring tube;
    a support system including a support plate, an inlet-side securement body and an outlet-side securement body, the support system having support system oscillation modes comprising elastic deformations of the support plate; and
    a housing, wherein:
        the measuring tube is rigidly connected to the support plate via the inlet-side securement body and the outlet-side securement body and is bounded by the inlet-side and outlet-side securement bodies;
        the measuring tube is connectable to a pipeline via the tube inlet section and the tube outlet section;
        the tube inlet section and the tube outlet section are each connected rigidly with the housing;
        the support plate includes one or more spring securements, each spring securement formed in the support plate by at least one cut in the support plate;
        the support plate is resiliently secured relative to the housing via the one or more spring securements such that the support plate has three translation oscillation degrees of freedom and three rotation oscillation degrees of freedom;
        eigenfrequencies of oscillations of the support plate relative to the housing due to the translation oscillation degrees of freedom and the rotation oscillation degrees of freedom are lower than a use-mode eigenfrequency of the bending oscillation use-mode;
        the use-mode eigenfrequency is lower than the eigenfrequencies of the support system oscillation modes;
        the measuring tube has a substantially two-fold rotational symmetry relative to a symmetry axis extending perpendicularly to the tube plane;
        a calibration factor describes in first approximation a proportionality between a mass flow through the measuring tube and a phase difference between oscillations of the measuring tube oscillating in the bending oscillation use-mode at the sites of the two oscillation sensors
        the calibration factor in case of rotations of the measuring transducer about a rotational axis, which extends perpendicular to the symmetry axis and perpendicular to a longitudinal axis of the measuring transducer has an angular velocity dependence;

the angular velocity dependence of the calibration factor depends on a respective position of each of the oscillation sensors;

positions of the oscillation sensors exist for which the angular velocity dependence of the calibration factor has a minimum; and each oscillation sensor is positioned such that the angular velocity dependence of the calibration factor does not exceed the minimum by more than 20% of the minimum.

2. The measuring transducer of claim 1, wherein the oscillation sensors are positioned such that the angular velocity dependence of the calibration factor does not exceed the minimum by more than 5% of the minimum.

3. The measuring transducer of claim 1, wherein each of the one or more spring securements of the support plate is generally spiral-shaped.

4. The measuring transducer of claim 1, wherein the inlet-side and outlet-side securement bodies are each positioned such that the use-mode eigenfrequency has a frequency separation from a nearest eigenfrequency of another oscillatory mode of the measuring tube that is not less than a frequency separation limit value, wherein the frequency separation limit value amounts to at least 2% of the use-mode eigenfrequency.

5. The measuring transducer of claim 4, wherein the frequency separation limit value amounts to at least 8% of the use-mode eigenfrequency.

6. The measuring transducer of claim 1, wherein an evaluation function, which is proportional to the frequency separation and inversely proportional to the use-mode eigenfrequency and to the calibration factor, has a local or absolute maximum, wherein the securement bodies are positioned such that the evaluation function is lower than a value of the maximum by no more than 8% of the value of the maximum.

7. The measuring transducer of claim 6, wherein the securement bodies are positioned such that the evaluation function is lower than the value of the maximum by no more than 2% of the value of the maximum.

8. The measuring transducer of claim 1, wherein the bending oscillation use-mode is an F3 bending oscillation mode.

9. The measuring transducer of claim 1, wherein the eigenfrequencies of oscillations of the support plate relative to the housing due to the translation oscillation degrees of freedom and the rotation oscillation degrees of freedom are at most half of the use-mode eigenfrequency of the bending oscillation use-mode, and wherein the eigenfrequency of the support system amounts to at least twice the use-mode eigenfrequency.

10. The measuring transducer of claim 1, wherein the number of spring securements is 1, 2, 3 or 4.

11. The measuring transducer of claim 1, wherein the measuring tube is bent generally in an S-shape, wherein in the tube plane has a longitudinal direction with respect to which a measuring tube axis has at no point an angle of greater than 85°.

12. The measuring transducer of claim 11, wherein the measuring tube includes, between the inlet-side and outlet-side securement bodies, two outer straight sections and a central straight section, which are connected by two arc-shaped sections, wherein the inlet-side and outlet-side securement bodies are each arranged at one of the outer straight sections, respectively.

13. The measuring transducer of claim 12, wherein a corresponding angle bisector extends between a tube central axis of the central straight section and a tube central axis of each of the respective outer straight sections, wherein a coordinate system includes a z-axis extending in the tube plane perpendicular to the angle bisectors, wherein the axis of the two-fold rotational symmetry forms the x-axis, wherein an x-z-plane defined by the x-axis and the z-axis extends through the outer straight sections away from the securement bodies.

14. The measuring transducer of claim 12, wherein a corresponding angle bisector extends between tube central axes of the central straight section and each of one of the outer straight sections, wherein each of the oscillation sensors is applied to the measuring tube between an intersection of one of the corresponding angle bisectors with the measuring tube and a point on the corresponding outer straight section of the measuring tube that is separated from a transition of the arc-shaped section to the corresponding outer straight section by a distance equivalent to no more than a radius of curvature of the corresponding arc-shaped section.

15. The measuring transducer of claim 1, wherein the tube inlet section and the tube outlet section each contribute, relative to the translation oscillation degrees of freedom and the rotation oscillation degrees of freedom of the support plate relative to the housing, supplementally to the one or more spring securements, to a degree of freedom specific spring constant, wherein a contribution of the tube inlet section deviates from a corresponding contribution of the tube outlet section by no more than 10% of the lesser of the tube inlet section contribution and the tube outlet section.

16. The measuring transducer of claim 15, wherein a shared contribution of the tube inlet section and the tube outlet section to the degree of freedom specific spring constants amounts to no more than 40% of the degree of freedom specific spring constants.

17. The measuring transducer of claim 1, wherein the tube inlet section and the tube outlet section have substantially the same tube cross section as the measuring tube and are manufactured as one piece with the measuring tube.

18. The measuring transducer of claim 1, wherein the eigenfrequencies of the translation oscillation degrees of freedom and rotation oscillation degrees of freedom of the support plate amount to not less than 70 Hz and/or no more than 400 Hz.

19. The measuring transducer of claim 1, wherein the at least one oscillation exciter is disposed at the center of the two-fold rotational symmetry, and wherein the at least one oscillation exciter is configured to excite bending oscillations perpendicular to the tube plane.

20. The measuring transducer of claim 1, wherein the measurement tube has an inner diameter of not more than 5 mm.

21. The measuring transducer of claim 1, wherein the distance is equivalent to no more than a half-radius of curvature of the corresponding arc-shaped section.

22. The measuring transducer of claim 1, wherein the distance is equivalent to no more than a half-radius of curvature of the corresponding arc-shaped section.

* * * * *